D. NEUSTADTER.

OVERALLS.

No. 9,863. Reissued Sept. 6, 1881.

Witnesses.
Robert Everett.
C. Albert Herbert

Inventor.
David Neustadter.
By James L. Norris
Atty

THE NORRIS PETERS CO., PHOTO-LITHO., WASHINGTON, D. C.

UNITED STATES PATENT OFFICE.

DAVID NEUSTADTER, OF SAN FRANCISCO, CALIFORNIA.

OVERALLS.

SPECIFICATION forming part of Reissued Letters Patent No. 9,863, dated September 6, 1881.

Original No. 196,693, dated October 30, 1877. Application for reissue filed July 14, 1881.

*To all whom it may concern:*

Be it known that I, DAVID NEUSTADTER, of the city and county of San Francisco, State of California, have invented an Improvement in Overalls, of which the following is a specification.

My invention relates to a certain improvement in overalls and pantaloons, having for its object to strengthen the garments at the point where the inner seams meet, where the greatest strain is received, and at the same time to simplify the construction and cost of manufacture.

To this end my invention consists, essentially, in a continuous strip crossing the crotch of the fly-seam and extending upward on each side of the fly, and secured thereto throughout its entire length, so as to prevent ripping, all of which will be more fully hereinafter described.

The following description of the nature and mode of applying and using my invention is sufficiently full and clear to enable any person skilled in the art to make and use the same, reference being had to the accompanying drawings and the figures and letters of reference thereon, making part of this specification.

Figure 1:
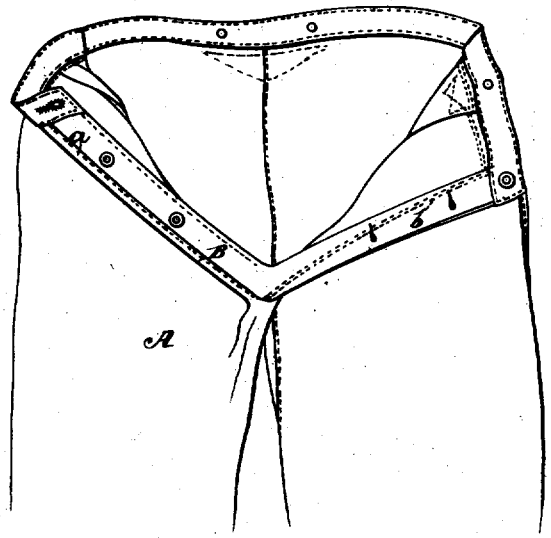
Figure 2:
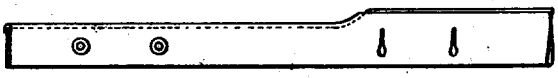

Figure 1 is a front view of the upper portion of a pair of overalls with the fly open and turned back. Fig. 2 is a view of the continuous fly separate from the garment.

The parts composing the overall A are cut out and united together in the usual manner; but, instead of separate pieces being employed for the sides and facings of the fly, a continuous strip, B, is cut out lengthwise or in the direction of the greatest strength of the material, and after being doubled to form a finished edge on the front it is secured to one side of the opening in the garment by a line of stitching, *a*, and to the inner face of the opposite side by the stitching *b*. Thus the strip B forms, when in place, the front of one part of the fly, and the inside face, containing the button-holes, the other and opposite part, so that no other parts or pieces are required to complete this portion of the garment. It forms a continuous strengthening-facing extending across the point of junction of the inside by seams, and it has the quality or property of resisting the strain thrown upon the weakest point of the garment and of preventing any ripping or tearing of the material after a period of use and wear. The buttons are secured to one part or end, and the button-holes are contained in the opposite part of the strip B, as shown in Fig. 2. They may be attached to and combined with these strips B before they are secured to the sides of the overall-fronts, and thus reduce the time and the number of manipulations required in the process of manufacturing these garments.

The above-described mode of applying my invention may be used when neatness and completeness of finish are desired; but if greater economy is sought it is obvious that the strip B need not necessarily be extended to the waist-band, because, as the crotch-seam is the point to be protected, it will be sufficient if the strip B extends beyond the crotch-seam so far only as may suffice to prevent its being ripped off by the strain to which it would be subjected in putting on or taking off the garment. The distance beyond the crotch-seam which the strip must extend in order to accomplish this result will vary according to the quality of the cloth and of the thread used in the manufacture; but in overalls intended for workingmen's wear where duck and thread of good quality are used, if the strip extends beyond the crotch a distance of three inches it will be amply sufficient to secure the desired result. Ordinarily, it will be found most convenient to shorten the strip, as described, on the side where the buttons are attached, and in such case that side of the fly-opening will be without facing, and the buttons will be attached to the garment itself.

The use of this continuous fly-facing gives a smoother and better finish to the inside of the overall, and adds to the comfort of the wearer by removing the superfluity of cloth that accumulates at the junction of the inside by seams when the fly and the facings are cut out of separate pieces.

As thus applied and arranged, my invention gives greater strength to the overall without increasing the amount of material at the point to be strengthened or adding to the labor of cutting out and making up the garment.

I am aware of the patent granted June 6, 1876, to R. Gibbons, and hereby disclaim the same; but,

Having thus fully described my invention, what I claim as new therein, and desire to secure by Letters Patent, is—

In overalls or pantaloons, a continuous strip crossing the crotch of the fly-seam and extending upward on each side of the fly, and secured thereto throughout its entire length so as to prevent ripping, substantially as described.

DAVID NEUSTADTER.

In presence of—
C. F. WYMAN,
F. H. WIDBER.